US006138817A

United States Patent [19]

Hjalmarsson et al.

[11] Patent Number: 6,138,817

[45] **Date of Patent: *Oct. 31, 2000**

[54] GRAVITY FEED GRADING UNIT

[75] Inventors: Helgi Hjalmarsson; Kristinn Steingrimsson; Horour Arnarson, all of Reykjavik, Iceland

[73] Assignee: H. F. Marel Ltd., Reykjavik, Iceland

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,394

[22] Filed: Sep. 13, 1996

[51] Int. Cl.[7] ............................ B65G 47/57; B65G 43/08

[52] U.S. Cl. ....................... 198/367.1; 198/360; 198/442; 198/493; 198/524; 198/530

[58] Field of Search .................................... 198/360, 367, 198/367.1, 442, 434, 493, 530, 524

[56] References Cited

U.S. PATENT DOCUMENTS

| | | | |
|---|---|---|---|
| 3,469,674 | 9/1969 | Mathews et al. | 198/442 |
| 5,197,607 | 3/1993 | Hakansson | 198/434 |

*Primary Examiner*—Christopher P. Ellis
*Assistant Examiner*—Mark A. Deuble
*Attorney, Agent, or Firm*—Pillsbury Madison & Sutro

[57] ABSTRACT

A grading unit divides a supply of objects into constituent portions and directs the divided portions to various predefined locations. At least one passageway is defined, being sufficiently inclined so that the supply of objects flows through the unit solely under the force of gravity. Diverting gates disposed along the passageway selectively divert objects from the passageway toward and through an associated secondary opening located adjacent the passageway. A dividing chute associated with each secondary opening is provided to direct the diverted objects to one of a plurality of different predefined locations.

11 Claims, 3 Drawing Sheets

GRAVITY FEED GRADING UNIT

BACKGROUND OF THE INVENTION

1. Field of the Invention

The present invention relates to a device for grading a supply of objects which flow through the device under the force of gravity.

2. Description of the Related Art

Conventional grading units employ conveyor belts to transfer a supply of objects to be graded through the unit. Push-off or pull-off gates are provided on one or both sides of the conveyor belt to selectively divert objects from the supply of objects off of the conveyor belt to be transmitted to another location.

Such conventional systems are of limited speed and efficiency. Conveyor belts typically move at relatively low speeds. In addition, where pull-off gates are employed, only two conveyor belts carrying a supply of objects to be sorted can be used, and where push-off gates are employed, only one conveyor belt can be used. Also, with pull-off or push-off gates, there is a minimum required distance between objects moving on the conveyor.

Moreover, the necessary motors, rollers, and belts of a conveyor belt system contribute considerable cost and complexity to the system and further require excessive space to accommodate the conveyor system.

SUMMARY OF THE INVENTION

It is an object of the present to overcome the above-described shortcomings present in conventional grading units. In accordance with this objective, the grading unit of the present invention is faster than conventional conveyor belt systems because the supply of objects moves through the unit more quickly and because the construction of the unit is such that it can be configured to accommodate several parallel streams of objects flowing through the unit. The present invention does not employ a conveyor belt and therefore eliminates the necessary motors, rollers, and belts that accompany a conveyor belt system. Accordingly, the cost, complexity, and spatial requirements of the present invention are reduced as compared to conventional conveyor belt based grading units.

In accordance with the principles of the present invention this objective is achieved by a grading system for dividing a group of objects into constituent portions having structure defining at least one passageway having an exit and oriented to receive a supply of objects and through which the supply of objects flows toward the exit. The passageway is inclined so that the supply of objects flowing therewithin flows substantially solely due to gravitational forces. The system further includes means for selectively diverting objects flowing within the passageway into any of a plurality of different predefined branch passageways or locations.

By employing gravity to move the objects down the passageway in which the objects can be selectively diverted, instead of a conveyor belt, the system is faster, less complex, more cost effective, and less space consuming. By employing vertically arranged diverting means, it is not necessary to maintain a minimum spacing between objects flowing through the passageway, thus further simplifying and expediting the sorting process.

Other objects, features, and characteristics of the present invention, as well as the methods of operation and functions of the related elements, and of the combinations of parts and economies of manufacture, will become apparent upon consideration of the appended claims with reference to the accompanying figures, all of which form a part of this specification.

DETAILED DESCRIPTION OF THE PRESENTLY PREFERRED EXEMPLARY EMBODIMENT

Figure 1:
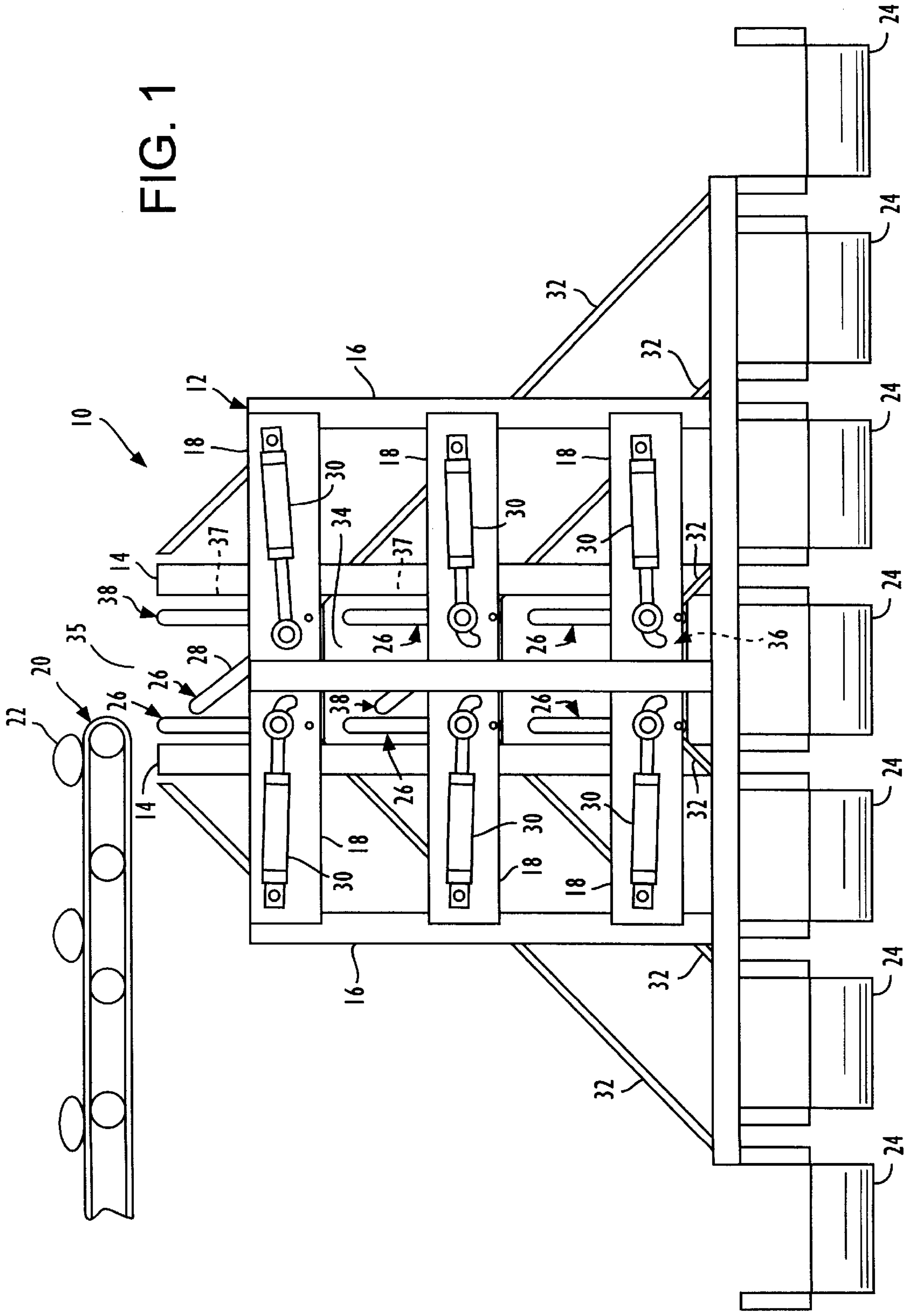
FIG. 1 is a side view of a first embodiment of the gravity feed grading unit of the present invention.
Figure 2:
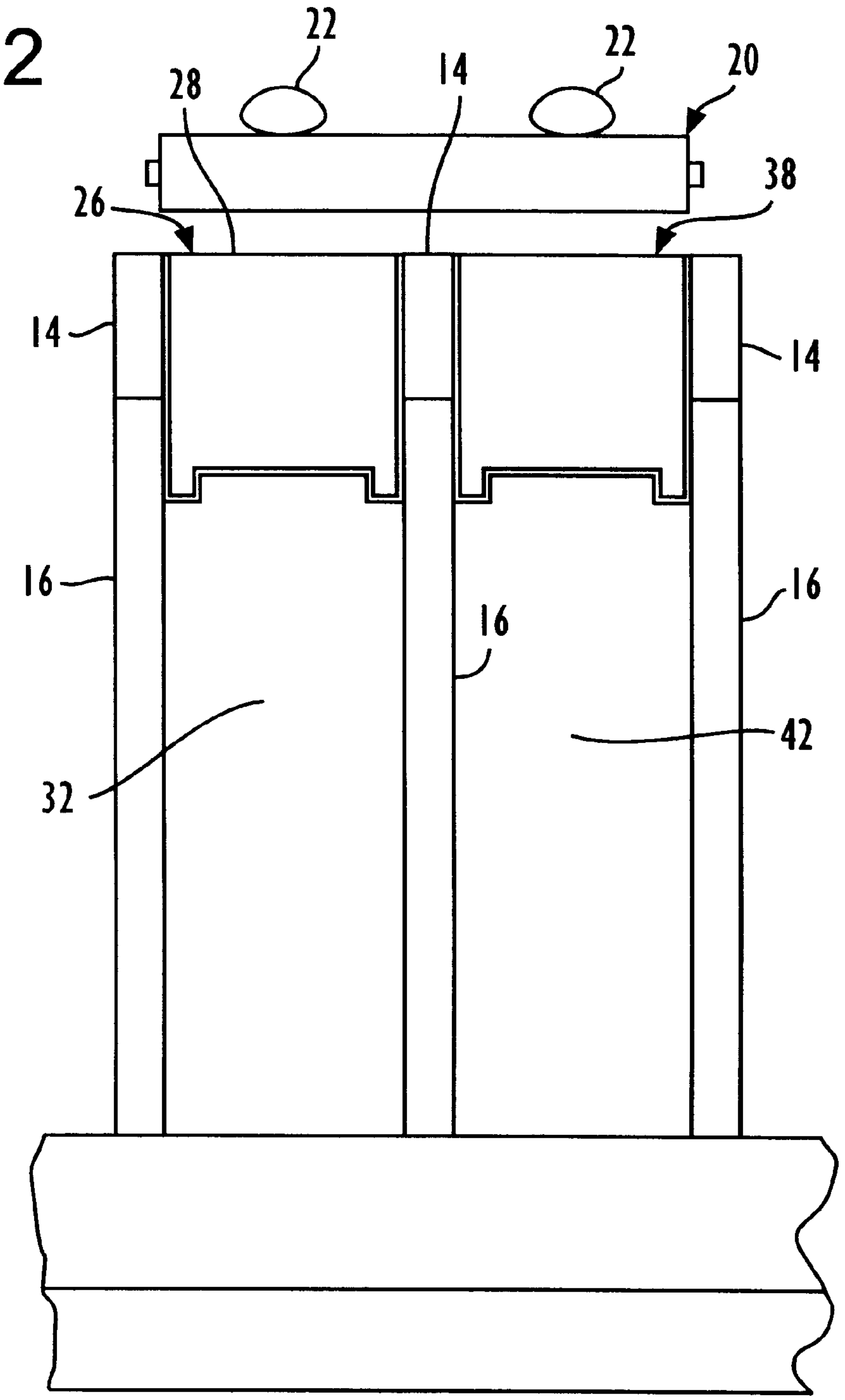
FIG. 2 is an end view of the first embodiment of the present invention.

A grading system 10 according to the present invention, as depicted in FIG. 1, includes a structural support frame 12 preferably including inner vertical members 14, outer vertical members 16, and various horizontal members 18.

An infeed apparatus 20, typically a conveyor belt from a processing unit (not shown), carrying a stream of objects 22 to be divided, or sorted, by the grading system 10 is disposed generally directly above the grading system 10. The end of conveyor 20 is disposed substantially directly over grading system 10 so that a stream of objects 22 falling off the end of conveyor 20 will be received in the grading system 10 and divided into constituent parts in a manner to be described below.

A plurality of take-away conveyor belts 24 can be provided below the grading system 10 to receive from the grading system 10 divided constituent portions of the supply of objects in a manner to be described more fully below and to carry the divided constituent portions to other predefined locations for further processing or the like.

As shown in FIG. 1, a number of flap mechanisms 26, or gates, are arranged in a vertically spaced relation along the inner vertical members 14. Although the depicted embodiment shows the flap mechanisms 26 arranged in 3 opposing pairs, the present invention contemplates other configurations of the flap mechanisms, such as more or fewer flap mechanisms, or having the flap mechanisms arranged orthogonally to one another. A preferred embodiment of the present invention includes 3–9 opposing pairs of flap mechanisms.

The flap mechanism 26 includes a flap door 28 and an actuator 30. The flap doors 28 are pivotably coupled at a lower end thereof to the top of an outwardly sloping dividing chute 32 associated with each flap mechanism 26. Each actuator is pivotably coupled at one end thereof to the flap door 28 and at the opposite end thereof to a portion of the structural support frame 12.

The inner vertical members 14 and the flap doors 28 disposed vertically along the inner vertical members 14 define a passageway 34 having an infeed opening 35 and an outfeed opening 36 and which is positioned to receive a supply of objects 22 falling off the end of conveyor 20 and into the infeed opening 35. The outfeed opening 36 of passageway 34 empties into one of a group of predefined locations, in the illustrated embodiment, one of the seven take-away conveyors 24.

Passageway 34 is inclined so that the supply of objects 22 received from the end of conveyor 20 proceeds through passageway 34 propelled solely by the force of gravity. In the preferred embodiment of the present invention, passageway 34 is vertical.

As shown in FIG. 1, each flap mechanism 26 can be opened (i.e., moved to an operative position) by extending the associated actuator 30 to pivot flap door 28 outwardly and into the passageway (as shown by the top right-hand flap mechanism 26 in FIG. 1) to selectively divert a portion of the supply of objects flowing through the passageway 34 from its normal undiverted path toward exit 36. Flap door 28 can also be moved back into its inoperative, or closed, position in which it does not divert objects flowing through the passageway. As can be appreciated from FIG. 1, when a flap mechanism 26 is opened, the objects flowing through passageway 34 which contact the flap door 28 are diverted through a secondary opening 37 associated with the flap mechanism into the outwardly sloping chute 32 to which the flap door 28 is pivotably connected. The sloping chute has a receiving end 31 and a drop-off end 33. Upon being diverted to the chute 32, the diverted objects will slide along the chute 32 from the receiving end 31 to the drop-off end 33 and will be directed to a one of the seven take-away conveyors 24 or another predefined location. It will be appreciated that by selectively opening flap mechanisms 26 one at a time as a supply of objects flows down passageway 34, the supply of objects is divided among the take-away conveyors 24, or other predefined locations, into constituent portions.

Figure 3:
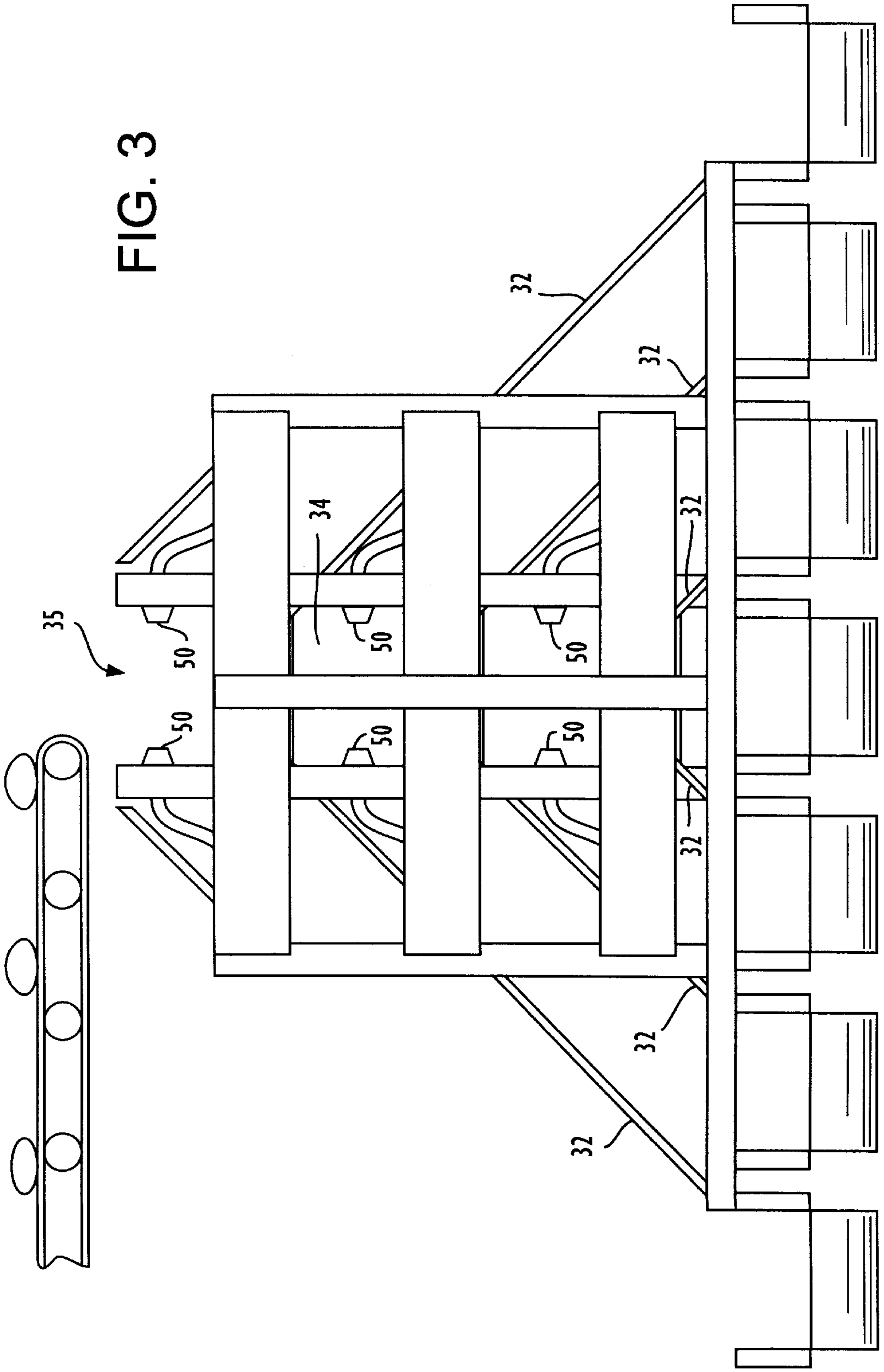
FIG. 3 is a side view of a second embodiment of the present invention.

The flap mechanisms shown and described represent the preferred method of selectively diverting objects from passageway 34. The present invention contemplates, however, other means for accomplishing the diversion as well, such as shown in FIG. 3 for example, blasts of air from nozzles 50 directed across passageway 34 to blow objects which encounter the blast to one side or the other into an associated secondary opening.

With the flap mechanisms 26, or other diverting means, arranged along mutually opposed sides of the passageway 34, as shown, or along a single side of the passageway, it is possible to arrange any number of similar passageways in parallel, side-by-side fashion. In FIG. 1, flap mechanisms 38 of a passageway adjacent to passageway 34 are shown in both an operative and inoperative position. In a preferred embodiment, side by side parallel passageways are provided with coincidentally positioned flap mechanisms, as shown in FIG. 1.

Parallel arrangement of multiple passageways is not feasible with conventional, substantially horizontal conveyor belt grading systems which employ pull-off or push-off gates because the gates would merely divert the objects from one passageway to an adjacent passageway.

This invention has been described with reference to what is currently considered to be the most practical and preferred embodiment. This is not meant, however, to limit the present invention. Rather, various modifications and arrangements are intended to be included within the spirit and scope of the appended claims.

What is claimed is:

1. A grading system for dividing a group of objects into constituent portions comprising:

at least two inclined passageways, each having an infeed opening and an outfeed opening;

said at least two inclined passageways disposed in an adjacent, side-by-side parallel relationship;

means for diverting objects supplied to said infeed opening to one of a plurality of diverted paths, said means for diverting disposed in each of said at least one inclined passageway and constructed and arranged to selectively allow said objects to flow undiverted to said outfeed opening;

each of said passageways being inclined sufficiently that objects flowing therewithin flow substantially solely due to gravitational forces; and means for directing objects diverted through each diverted path to one of a plurality of different predefined locations.

2. The system of claim 1 wherein said diverting means comprises a plurality of pairs of flap mechanisms being spaced along at least one said passageway, each flap mechanism of a respective pair being disposed on opposite sides of said passageway.

3. The system of claim 2 wherein said directing means comprises an inclined dividing chute associated with each flap mechanism and having a receiving end and a drop-off end, said objects diverted by said flap mechanism being received at said receiving end and traversing said chute from said receiving end to said drop-off end and being dropped off at said drop-off end at said predefined location.

4. The system of claim 3 wherein each of said flap mechanisms comprises:

a flap door pivotably mounted adjacent said passageway to an upper end of said associated dividing chute; and an actuator operatively coupled with said flap door for selectively pivoting said flap door between said closed position in which said flap door is oriented so as to permit the objects flowing within said passageway to flow substantially unimpeded through said outfeed opening and said open position in which said flap is oriented so that a portion thereof extends into said passageway and diverts any objects flowing within said passageway that contact said flap through said associated secondary opening to said receiving end of said dividing chute.

5. The system of claim 1, wherein said plurality of different predefined locations comprises a plurality of conveyors disposed in a horizontal relationship.

6. The system of claim 1 where each of said passageways is substantially vertical.

7. The system of claim 1 wherein said diverting means comprises a plurality of pairs of flap mechanisms, each pair being associated with a respective first and second diverted path, and each pair of flap mechanisms disposed for selective movement between an inoperative position in which the objects flowing within each respective passageway are permitted to continue to flow therethrough substantially undiverted past each associated diverted path and an operative position in which the objects flowing within each said respective passageway are diverted by one diverting flap mechanism of said pair toward one of said associated diverted paths.

8. The system of claim 7 wherein said first and second diverted paths are disposed in parallel coincident positions along each respective passageway.

9. The grading system of claim 1 wherein said plurality of different predefined locations comprise a plurality of conveyors disposed in a horizontal relationship.

10. The system of claim 1 wherein said diverting means comprises an air nozzle associated with each secondary opening for selectively emitting a blast of air and directing said blast of air across said passageway to divert objects flowing through said passageway toward and through said associated secondary opening.

11. A grading system comprising:

at least two inclined passageways disposed in an adjacent, side-by-side parallel relationship, each of said at least two passageways, disposed such that the infeed openings of each passageway are laterally positioned along a drop off location at an end of a feeding conveyor device, said passageways having an infeed opening and an outfeed opening, and each passageway being inclined sufficiently that objects flowing therewithin flow substantially solely due to gravitational forces;

means for diverting objects supplied to said infeed opening to one of a plurality of diverted paths, said diverted paths arranged along opposite sides of a respective passageway and said means for diverting arranged to selectively allow objects to flow undiverted to said outfeed opening; and means for directing objects diverted through said at least one diverted path, said means for directing objects constructed and arranged to direct objects to one of a plurality of conveyors disposed in a horizontal relationship.

* * * * *